United States Patent
Aoyama et al.

(10) Patent No.: US 7,643,270 B2
(45) Date of Patent: Jan. 5, 2010

(54) ELECTRODE FOIL FOR CAPACITORS AND SOLID ELECTROLYTIC CAPACITOR

(75) Inventors: Tatsuji Aoyama, Kyoto (JP); Hiroyuki Matsuura, Shiga (JP); Shigetaka Furusawa, Kyoto (JP); Yukiya Shimoyama, Osaka (JP); Kazuhiko Mikami, Shimane (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/178,992

(22) Filed: Jul. 24, 2008

(65) Prior Publication Data

US 2009/0027832 A1    Jan. 29, 2009

(30) Foreign Application Priority Data

| Jul. 25, 2007 | (JP) | 2007-192812 |
| Jul. 25, 2007 | (JP) | 2007-192813 |
| Jul. 25, 2007 | (JP) | 2007-192814 |
| Jul. 25, 2007 | (JP) | 2007-192815 |

(51) Int. Cl.
*H01G 9/04* (2006.01)
*H01G 9/145* (2006.01)

(52) U.S. Cl. .................... 361/532; 361/530
(58) Field of Classification Search ............ 361/523, 361/528–530, 532, 535
See application file for complete search history.

(56) References Cited

U.S. PATENT DOCUMENTS 6,519,137 B1 *    2/2003    Nitta et al. ............... 361/525

FOREIGN PATENT DOCUMENTS

| JP | 4-7086 | 2/1992 |
| JP | 09092582 A * | 4/1997 |
| JP | 3439064 | 6/2003 |

* cited by examiner

*Primary Examiner*—Eric Thomas
(74) *Attorney, Agent, or Firm*—Wenderoth, Lind and Ponack, L.L.P.

(57) ABSTRACT

A solid electrolytic capacitor that includes a cathode foil and solid electrolyte made of conductive polymer. This cathode foil is made by providing a nickel layer on a surface of a base material made of valve metal. This nickel layer includes a layer containing only nickel and a layer containing nickel oxide. Both large capacitance and low equivalent series resistance are achievable at the same time with this simple structure at low cost.

9 Claims, 3 Drawing Sheets

ELECTRODE FOIL FOR CAPACITORS AND SOLID ELECTROLYTIC CAPACITOR

BACKGROUND OF THE INVENTION

1. Field of the Invention

The present invention relates to capacitors used in diverse electronic devices, and more particularly to electrode foils for wound capacitors using conductive polymer for their solid electrolyte, and solid electrolytic capacitors using this type of electrode foil.

2. Background Art

In line with the increasing use of high frequencies for electronic devices, electrolytic capacitors, one type of electronic components, are also expected, more than ever before, to have large capacitance and good impedance characteristics in a high frequency range. To meet these demands, various solid electrolytic capacitors using conductive polymer with high electric conductivity as solid electrolyte have been studied.

To satisfy the demand for large capacitance, wound solid electrolytic capacitors (an anode foil and a cathode foil are wound with a separator in between) using conductive polymer as solid electrolyte have been commercialized. A winding structure can achieve large capacitance more easily compared to a structure of stacked electrode foils.

This type of solid electrolytic capacitors demonstrate good service life, good temperature characteristic, and in particular, excellent high frequency characteristic, and are thus broadly employed in power circuits of personal computers. Now, a technology of using a nonvalve metal foil as the cathode foil, such as a nickel foil, that hardly forms natural oxidation film is proposed with the aim of increasing electrostatic capacitance C. With this technology, the electrostatic capacitance of the cathode becomes substantially infinite. This technology is disclosed in Examined Japanese Patent Publication No. H4-7086.

A plain foil of nonvalve metal cannot be roughened by etching. Accordingly, an effective contact area between the cathode foil and solid electrolyte is reduced, generating a large equivalent series resistance in a finished capacitor. Therefore, a technology of using the cathode foil configured in a different way has been proposed. A surface of an aluminum foil is roughened by etching, and then nickel, which is nonvalve metal, is plated on this roughened surface by electroless plating. This technology is disclosed in the Japanese Patent No. 3439064.

The above conventional solid electrolytic capacitor uses the nickel foil as the cathode foil. However, the nickel foil is more expensive compared to the aluminum foil, which is generally used for the cathode foil. Futhermore, the conventional electroless-plating method used for plating nickel on the surface of metal foil, whose surface is roughened by etching, is not capable of further thinning a plating film. Accordingly, it is difficult to uniformly plate the nickel film into fine pores on the roughened surface. In addition, 1-μm thick film will fill etching pits. Furthermore, an oxide film that exists on the surface of the roughened metal foil hinders firm bonding between the metal foil and the nickel plating film.

SUMMARY OF THE INVENTION

The present invention offers an inexpensive and highly-reliable solid electrolytic capacitor with a simple structure that achieves both large capacitance and low equivalent series resistance at the same time.

A capacitor electrode foil of the present invention includes a base material made of a valve metal foil, and a nickel layer including nickel and nickel oxide. The nickel layer is formed on the surface of the base material.

The solid electrolytic capacitor of the present invention includes an element and solid electrolyte. The element is formed by winding an anode foil made of aluminum, whose surface is roughened to form a dielectric oxide film layer, and a cathode foil made of aluminum with a separator in between. The solid electrolyte is made of conductive polymer, and is absorbed between the anode foil and the cathode foil of this element. The capacitor electrode foil of the present invention is used as the cathode foil.

When the solid electrolytic capacitor uses this capacitor electrode foil as the cathode foil, and solid electrolyte is high polymer, electrostatic capacitance of the cathode foil is vanished and is not developed. Accordingly, capacitance is developed only in the anode foil. This enables a great increase in capacitance. Nickel oxide contained in the nickel layer is semiconductor, and thus has conductivity. This greatly contributes to reduction of equivalent series resistance. Nickel oxide on the surface of the nickel layer suppresses an increase of equivalent series resistance due to oxidation even during carbonization of the separator or heating in a reflow operation. In addition, corrosion resistance is improved, and a bonding with the solid electrolyte is strengthened.

In addition, the nickel layer forms a diffusion layer including aluminum that is valve metal, nickel, and oxygen by the heat generated during deposition of the nickel layer. This increases the bonding strength between the valve metal foil and the nickel layer. Furthermore, since the nickel layer can be drastically thinned with ease, the present invention achieves both large capacitance and low equivalent series resistance with a simple structure at low cost.

DETAILED DESCRIPTION OF THE INVENTION

First Embodiment

An electrode foil for capacitors (hereafter referred to as "capacitor electrode foil") in the first embodiment of the present invention is described below.

Figure 1A:
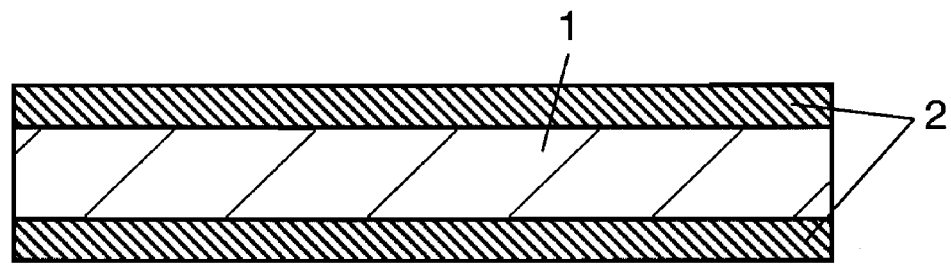
FIG. 1A is a sectional view of a capacitor electrode foil in accordance with a first embodiment of the present invention.

FIG. 1A is a sectional view illustrating a structure of the capacitor electrode foil in accordance with the first embodiment of the present invention. In FIG. 1A, base material 1 is an aluminum foil, which is valve metal. Nickel layer 2 includes nickel and nickel oxide.

Figure 1B:
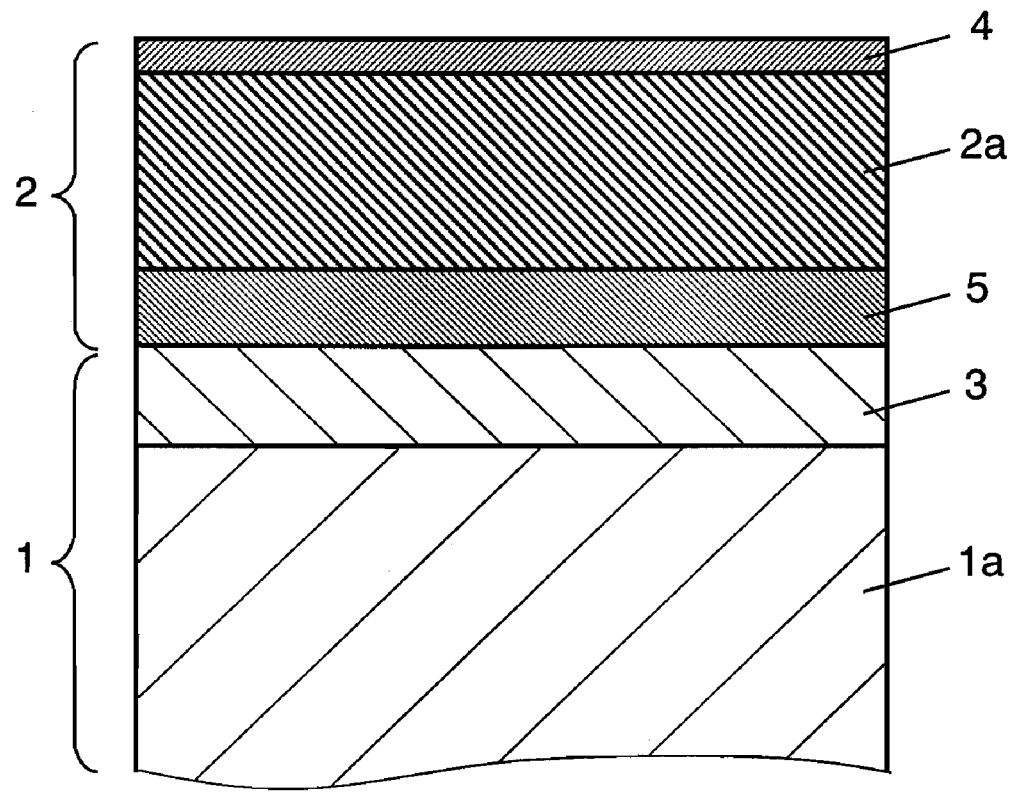
FIG. 1B is an enlarged detail of a cross section of the capacitor electrode foil in accordance with the first embodiment of the present invention.

FIG. 1B is an enlarged detail of a cross section of the structure of the capacitor electrode foil in the first embodiment of the present invention. In FIG. 1B, natural oxidation film layer 3 including aluminum 1a and aluminum oxide (Al—O) is formed on a surface of base material 1 made of the aluminum foil. Nickel layer 2 formed of nickel and nickel oxide includes layer 2a containing only nickel and layer 4 containing nickel oxide (Ni—O). In addition, diffusion layer 5 made of nickel, aluminum, and oxygen (Ni—Al—O) is at least partially formed between natural oxidation film layer 3 including aluminum oxide (Al—O) that contains aforementioned aluminum 1a, and layer 2a containing only nickel.

In this capacitor electrode foil as configured above, high-purity aluminum foil of 50-μm thick is used as base material 1. Fine nickel particles are deposited on the surface of this base material 1 by adjusting oxygen concentration in a vacuum environment so as to form nickel layer 2 (0.1-μm thick on each face) including layer 2a containing only nickel and layer 4 containing nickel oxide. Other than deposition, dry processes such as sputtering and CVD method can be used for forming nickel layer 2 so as to achieve the same effect. Downsizing is feasible by thinning base material 1. Contrarily, base material 1 may be thickened to reduce the equivalent series resistance (hereafter referred to as "ESR").

The capacitor electrode foil in the first embodiment of the present invention as configured above has conductivity because layer 4 containing nickel oxide in nickel layer 2 is semiconductor. This significantly contributes to reduction of the ESR. In addition, layer 4 containing nickel oxide on the surface of nickel layer 2 improves corrosion resistance. Furthermore, bonding with the solid electrolyte strengthens when this electrode foil is used as a cathode foil in manufacturing a solid electrolytic capacitor using conductive polymer as a solid electrolyte.

When the heat is generated at depositing nickel layer 2, the above deposited nickel layer 2 develops alloy of aluminum, nickel, and oxygen between natural oxidation film layer 3 formed of aluminum oxide (Al—O) of aluminum 1a and layer 2a containing only nickel. The bonding strength between nickel layer 2 and base material 1 thus increases, facilitating drastic thinning of nickel layer 2. Accordingly, this simple structure achieves both large capacitance and low ESR at the same time at low cost.

In the first embodiment, the thickness of nickel layer 2 is 0.1 μm on each face. Further thinning of the layer is technically feasible without any difficulty, and a sufficient effect is also expectable. On the other hand, no greater effect can be expected by making the layer thicker. It will just increase the cost. Accordingly, the thickness of nickel layer 2 is 0.5 μm on each face, and preferably 0.1 μm per face is sufficient.

Figure 2:
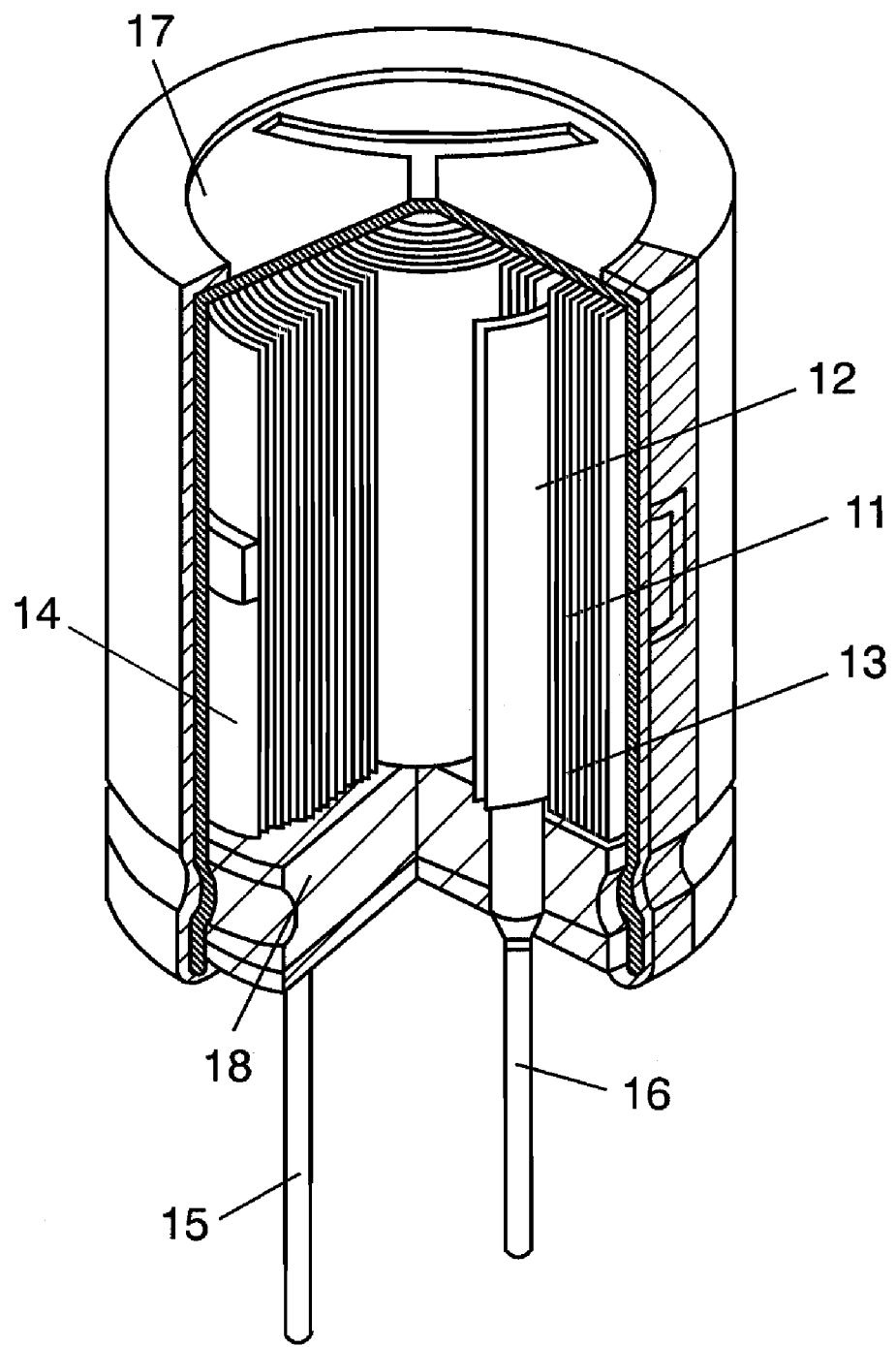
FIG. 2 is a fragmentary sectional view of a solid electrolyte capacitor using the capacitor electrode foil in accordance with the first embodiment of the present invention.

FIG. 2 is a fragmentary sectional view of the solid electrolytic capacitor employing the capacitor electrode foil in the first embodiment of the present invention. In FIG. 2, this capacitor electrode foil is used as cathode foil 12. Anode foil 11 is made of an aluminum foil. The surface of anode foil 11 is etched to form a roughened layer. Then, a dielectric oxide film layer is formed on this roughened layer by chemical conversion treatment. Separator 13 is made of electrolytic paper. Anode foil 11 and cathode foil 12 are wound in the state in which this separator 13 is disposed between them to complete capacitor element 14. This capacitor element 14 is then heated to carbonize separator 13.

Solid electrolyte made of conductive polymer is absorbed in separator 13 disposed between anode foil 11 and cathode foil 12 of capacitor element 14. Anode lead 15 and cathode lead 16 are bonded to anode foil 11 and cathode foil 12, respectively, and led out. Anode lead 15 and cathode lead 16 are then passed through sealing member 18, and inserted into cylindrical aluminum case 17 with, which has a closed bottom, to seal an opening of aluminum case 17.

The aforementioned solid electrolyte is solid electrolyte of polyethylene dioxithiophene, which is a chemically-polymerized conductive polymer. This is made by dipping capacitor element 14 in a solution containing one part of 3,4-ethylenedioxithiophene, which is heterocyclic monomer; two parts of ferric p-toluenesulfonate, which is an oxidant; and four parts of n-buthanol, which is a polymer solvent; and the taking element 14 out of the solution to leave it at 85° C. for 60 minutes. However, the present invention is not limited to this solid electrolyte.

A capacitance and ESR of the solid electrolytic capacitor as manufactured above are measured, and results are compared with a conventional capacitor (using an etched aluminum foil without the nickel layer as the cathode foil). Table 1 shows the results.

TABLE 1

|  | Capacitance (μF) | ESR (mΩ) |
|---|---|---|
| First embodiment | 1370 | 4.5 |
| Prior art | 510 | 8.0 |

It is apparent from Table 1 that the solid electrolytic capacitor using the capacitor electrode foil in the first embodiment as cathode foil 12 and the conductive polymer as solid electrolyte demonstrates better performance compared to the prior art: about 2.7 times larger capacitance and about a half ESR. This is because the electrostatic capacitance of cathode foil 12 is eliminated by forming nickel layer 2 including nickel and nickel oxide on the surfaces (both faces) of cathode foil 12. The capacitance is thus developed only in anode foil 11. Accordingly, both significant expansion of capacitance and significant reduction of ESR are achievable at the same time.

Layer 4 containing nickel oxide in nickel layer 2 is semiconductor, and thus has conductivity. This greatly contributes to reduction of the ESR. The ESR scarcely increases due to oxidation by carbonization of separator 13 or heating in the reflow operation. Nickel oxide on the surface of nickel layer 2 improves corrosion resistance and strengthens bonding with solid electrolyte.

In addition, when the heat is generated at depositing nickel layer 2, deposited nickel layer 2 develops alloy of aluminum, nickel, and oxygen between natural oxidation film layer 3 formed of aluminum oxide (Al—O) of aluminum 1a and layer 2a containing only nickel. This increases the bonding strength between nickel layer 2 and cathode foil 12. Furthermore, since nickel layer 2 can be drastically thinned with ease, both large capacitance and low ESR are achievable at the same time with this simple structure at low cost.

In the first embodiment, the thickness of nickel layer 2 is 0.1 μm on each face. Further thinning of the layer is technically feasible without any difficulty, and a sufficient effect can also expected. On the other hand, no greater effect can be expectable by making the layer thicker. It will just increase the cost. Accordingly, the thickness of nickel layer 2 is 0.5 μm on each face, and preferably 0.1 μm per face is sufficient.

The first embodiment refers to an example of using separator 13 made by carbonizing electrolytic paper mainly made of cellulose fiber. However, the present invention is not limited to this type of separator 13. By applying paper durability reinforcement (polyacrylamide or its derivatives) or surface hydrophobicity treatment using silane coupling agent to the electrolytic paper mainly made of cellulose fiber, intended capacitor characteristics are achievable without carbonization at a high-temperature environment of about 300° C.

If separator 13 mainly made of synthetic fiber is used, a uniform solid electrolyte can be formed inside capacitor element 14 without uneven distribution of solid electrolyte inside fibers, such as the case of cellulose fiber. This enables further reduction of impedance at a high frequency range. It is necessary to select synthetic fiber that is chemically stable in polymerization solution used for forming solid electrolyte, and has good heat resistance. For example, polyethylene terephthalate, acryl, nylon, polyvinyl alcohol, and their derivatives are preferable. In particular, a mixed-crystal fiber with polyethylene terephthalate and its derivatives, or polyvinyl alcohol combines well with polyethylene dioxithiophene, which is the solid electrolyte. Adhesion and bonding strengths thus improve. Accordingly, the use of synthetic fiber achieves over 10% reduction in impedance at a high-frequency range, compared to that of the separator using carbonized electrolytic paper mainly made of cellulose fiber.

In this embodiment, separator 13 is carbonized by heating wound capacitor element 14. However, the present invention is not limited to this method. Separator 13 may be separately heated for carbonization, and then carbonized separator 13 may be used for winding capacitor element 14.

Furthermore, a surface-mount solid electrolytic capacitor can be made by passing anode lead 15 and cathode lead 16, which is led out from anode foil 11 and cathode foil 12, through a resin plate (not illustrated), and then bending their lead portions.

Second Embodiment

A capacitor electrode foil in the second embodiment of the present invention is described below.

The second embodiment has a partially different structure from that of the cathode foil in the solid electrolytic capacitor in the first embodiment described with reference to FIG. 2. Other structures are the same as that of the first embodiment, and thus the same reference marks are given to the same components to omit duplicate description. Only the point that differs is described below.

Figure 3:
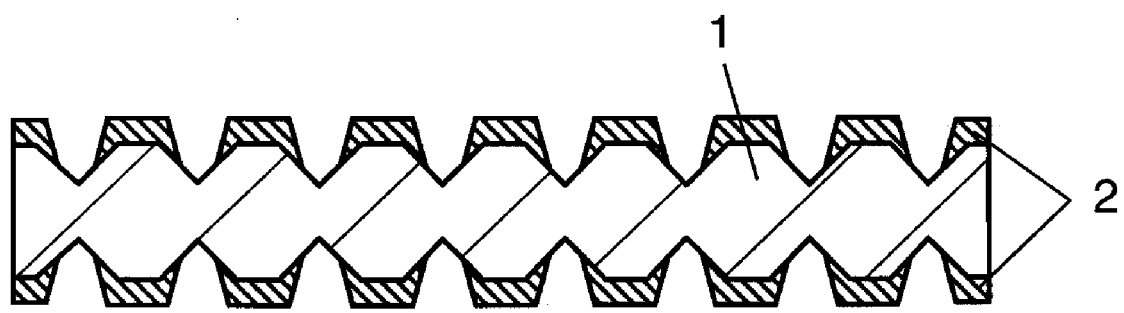
FIG. 3 is a sectional view of the capacitor electrode foil in accordance with a second embodiment of the present invention.

FIG. 3 is a sectional view of a structure of the capacitor electrode foil in the second embodiment. In FIG. 3, the surface of base material 1, made of aluminum, of cathode foil 12 is etched to form a roughened layer. Then, nickel layer 2 including nickel and nickel oxide is formed on this roughened layer.

The capacitance and ESR of the solid electrolytic capacitor in the second embodiment as configured above are measured. Table 2 shows the results and comparison with a conventional capacitor (using an etched aluminum foil without nickel layer as the negative electrode foil).

TABLE 2

|  | Capacitance (μF) | ESR (mΩ) |
| --- | --- | --- |
| Second embodiment | 1420 | 4.1 |
| Prior art | 510 | 8.0 |

As with the first embodiment, it is apparent from Table 2 that the solid electrolytic capacitor in the second embodiment demonstrates better performance compared to the prior art: about 2.8 times larger capacitance and about half the ESR. The performance is even better than that of the first embodiment. This is because the surface of aluminum, which is cathode foil 12, is etched to form a roughened layer. This generates alloy of aluminum, nickel, and oxygen, resulting in reinforcing the bonding strength between aluminum and nickel layer 2. Accordingly, large capacitance and low ESR are achievable at the same time.

Third Embodiment

A capacitor electrode foil in the third embodiment of the present invention is described.

The third embodiment has a partially different structure from that of the cathode foil in the solid electrolytic capacitor in the first embodiment described with reference to FIG. 2. Other structures are the same as those of the first embodiment, and thus the same reference marks are given to the same components to omit duplicate description. Only the point that differs is described below.

In the third embodiment, nickel layer 2 including nickel and nickel oxide is formed only on one surface of cathode foil 12. The capacitance and ESR of the solid electrolytic capacitor in the third embodiment as configured above are measured. Table 3 shows the results and comparison with a conventional capacitor (using an etched aluminum foil without nickel layer as the negative electrode foil).

TABLE 3

|  | Capacitance (μF) | ESR (mΩ) |
| --- | --- | --- |
| Third embodiment | 1350 | 6.2 |
| Prior art | 510 | 8.0 |

It is apparent from Table 3 that the solid electrolytic capacitor in the third embodiment demonstrates better performance compared to the prior art: about 2.6 times larger capacitance and about ¾ of the ESR. These are all achieved by the same effect as that described in the first embodiment. In addition, although nickel layer 2 is only formed on one surface of cathode foil 12, the electrostatic capacitance in an aluminum dielectric oxide film formed on the surface where nickel layer 2 is not formed is also practically eliminated.

However, the ESR is greater, compared to that of the first embodiment, and remains at almost the same level as the prior art. This is because nickel layer 2 is formed only on one surface of cathode foil 12. Accordingly, nickel layer 2 needs to be formed on at least one surface.

The solid electrolytic capacitor of the present invention achieves both large capacitance and low ESR at the same time, and thus is effectively applicable to capacitors used in diversifying fields.

What is claimed is:

1. A capacitor electrode foil comprising:
   a base material made of a valve metal foil; and
   a nickel layer formed on a surface of the base material;
   wherein the nickel layer includes a layer containing only nickel and a layer containing nickel oxide; and
   wherein the valve metal foil is an aluminum foil, and a diffusion layer of aluminum, nickel, and oxygen is formed between the aluminum foil and the layer containing only nickel.

2. The capacitor electrode foil of claim 1, wherein the layer containing nickel oxide is formed at least on an outer surface of the layer containing only nickel.

3. The capacitor electrode foil of claim 1, wherein a thickness of the nickel layer is not greater than 0.5 μm on one face, the nickel layer being formed on the surface of the base material, and including the layer containing only nickel and the layer containing nickel oxide.

4. The capacitor electrode foil of claim 1, wherein a roughened layer that is roughened is formed on a surface of the valve metal foil.

5. The capacitor electrode foil of claim 1, wherein the nickel layer is formed on at least one face of the base material, the nickel layer being formed on the surface of the base material, and including the layer containing only nickel and the layer containing nickel oxide.

6. A solid electrolytic capacitor comprising:

an element formed by winding an anode foil and a cathode foil with a separator in between, the anode foil being made of aluminum on which a dielectric oxide film layer is formed by roughening a surface, and the cathode foil being made of aluminum;

solid electrolyte made of conductive polymer, the solid electrolyte being absorbed between the anode foil and the cathode foil of the element;

a metal case for housing the element and the solid electrolyte; and a sealing member for sealing an opening of the metal case; wherein the cathode foil is the capacitor electrode foil of claim 1.

7. The solid electrolytic capacitor of claim 6, wherein the separator is electrolytic paper mainly made of a cellulose fiber.

8. The solid electrolytic capacitor of claim 6, wherein the separator is carbonized paper made by carbonizing electrolytic paper mainly made of a cellulose fiber.

9. The solid electrolytic capacitor of claim 6, wherein the separator is mainly made of a synthetic fiber.

* * * * *